United States Patent
Shah

(10) Patent No.: US 10,601,704 B2
(45) Date of Patent: Mar. 24, 2020

(54) ASYMMETRIC ROUTING MINIMIZATION

(71) Applicant: Cisco Technology, Inc., San Jose, CA (US)

(72) Inventor: Himanshu Shah, Milpitas, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/019,466

(22) Filed: Jun. 26, 2018

(65) Prior Publication Data

US 2019/0140940 A1  May 9, 2019

Related U.S. Application Data

(60) Provisional application No. 62/539,394, filed on Jul. 31, 2017.

(51) Int. Cl.
*H04L 12/28* (2006.01)
*H04L 12/721* (2013.01)
*H04L 12/46* (2006.01)

(52) U.S. Cl.
CPC .......... *H04L 45/38* (2013.01); *H04L 12/4633* (2013.01)

(58) Field of Classification Search
None
See application file for complete search history.

(56) References Cited

U.S. PATENT DOCUMENTS

| | | | |
|---|---|---|---|
| 2014/0119189 A1* | 5/2014 | Lin | H04L 12/4633 370/235 |
| 2015/0063102 A1* | 3/2015 | Mestery | H04L 41/12 370/230 |
| 2015/0124608 A1* | 5/2015 | Agarwal | H04L 47/122 370/235 |
| 2015/0131666 A1* | 5/2015 | Kang | H04L 45/745 370/392 |
| 2016/0080502 A1* | 3/2016 | Yadav | G06F 16/285 709/227 |
| 2016/0234091 A1* | 8/2016 | Emmadi | H04L 43/12 |
| 2016/0373341 A1* | 12/2016 | Venugopal | H04L 12/4633 |

* cited by examiner

*Primary Examiner* — Clemence S Han
(74) *Attorney, Agent, or Firm* — Polsinelli PC

(57) ABSTRACT

In some examples, an example method to minimize asymmetric routing at a network node may include maintaining a flow table including one or more records, each record indicating a packet flow and a corresponding tunnel, receiving a data packet to process at a network node, and determining whether to process the data packet as a follower node. The method may also include, responsive to a determination to process the data packet as a follower node, determining whether there is an entry in the flow table for a packet flow associated with the received packet, and, responsive to a determination that there is an entry in the flow table for the packet flow, transmitting the received data packet through a tunnel corresponding to the packet flow.

18 Claims, 6 Drawing Sheets

ASYMMETRIC ROUTING MINIMIZATION

CROSS REFERENCE TO RELATED APPLICATIONS

This application claims priority to U.S. Patent App. No. 62/539,394, filed on Jul. 31, 2017, which is hereby incorporated by reference in its entirety.

FIELD

The present disclosure relates generally to network communications.

BACKGROUND

In a typical network, there may be multiple paths between two nodes, and the traffic flows between the two nodes may be bi-directional flows. For example, with equal-cost multi-path (ECMP) routing between two routers, each router can independently select the route or flow for each direction. Each router needs to have the smarts to appropriately select the route or flow when forwarding the traffic to the other router. This may result in asymmetric routing, which is a situation where packets follow a different route in an outbound direction than they follow when returning in the inbound direction. Requiring routers to have the smarts to select the route or flow may result in scaling issues, particularly for large routers, such as provider edge routers.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to some examples, methods to minimize asymmetric routing at a network node are described. An example method to minimize asymmetric routing at a network node may include maintaining a flow table including one or more records, each record indicating a packet flow and a corresponding tunnel. The method may also include receiving a data packet to process at a network node, and determining whether to process the data packet as a follower node. The method may further include, responsive to a determination to process the data packet as a follower node, determining whether there is an entry in the flow table for a packet flow associated with the received packet, and, responsive to a determination that there is an entry in the flow table for the packet flow, transmitting the received data packet through a tunnel corresponding to the packet flow The objects and advantages of the embodiments will be realized and achieved at least by the elements, features, and combinations particularly pointed out in the claims. Both the foregoing general description and the following detailed description are given as examples, are explanatory and are not restrictive of the invention, as claimed.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DESCRIPTION OF EMBODIMENTS

Figure 1:
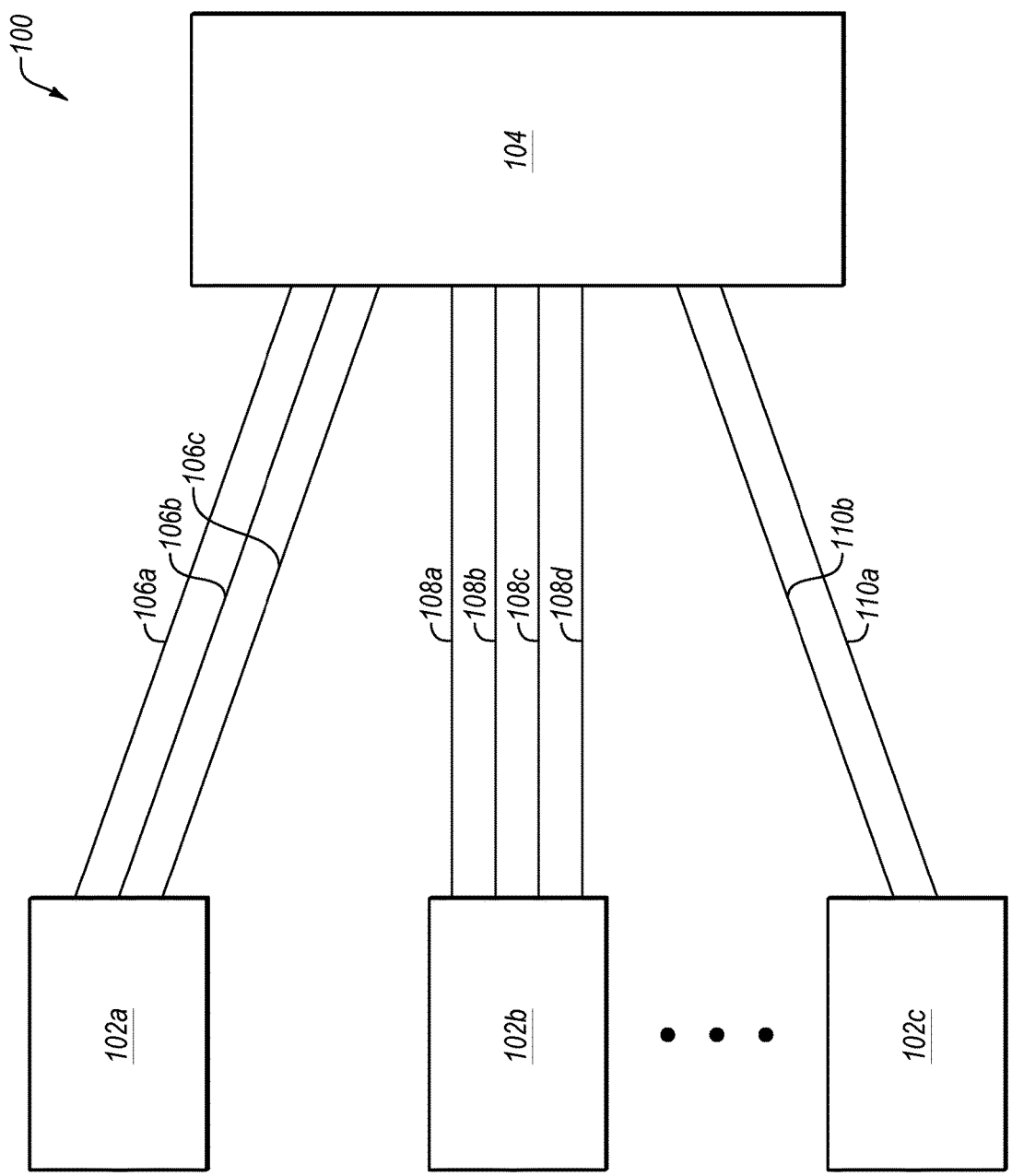
FIG. 1 illustrates an overview of an environment and devices on which some embodiments of the present disclosure may operate.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to minimizing asymmetric routing.

As discussed above, in a network, there may be multiple paths between two network nodes, Node A and Node B. Node A may select a path for a packet flow to Node B based on one or more policies. Packet flow (also referred to as a flow, traffic flow, network flow, or data flow) is a sequence of packets from a source to a destination. Subsequently, Node A may choose the same path for the same packet flow unless that path is unavailable (e.g., the path is down) or there is change in the policies that may result in selection of a different path to Node B. Similarly, for the same packet flow in the reverse direction, Node B may select a path for the packet flow in the reverse direction based on one or more policies. As a result, for the same packet flow, Node A and Node B may select different paths, which results in asymmetric routing. That is, Node A may select one path for the packet flow from Node A to Node B, and Node B may select a different path for the same packet flow in the reverse direction from Node B to Node A. This requires that both nodes, Node A and Node B, have the intelligence to apply the policies to select the paths.

The present disclosure generally describes using flow data to minimize asymmetric routing between two nodes. The nodes may be network nodes. The present disclosure takes advantage of the realization that a path between the two network nodes may be a tunnel, and that there may be a multiple number of tunnels between the two network nodes. A tunnel allows for the movement of data from one network node to another network node. A tunnel is a link across a network, and extends between the two network nodes. Once a tunnel is configured, a network node at one end of the tunnel is able to transmit data intended for a destination, such as, by way of example, a domain, an application, and/or the like, through the tunnel to the network node at the other end of the tunnel, for eventual delivery to the destination.

In some embodiments, between the two network nodes, one network node may assume a role of a "selector node," and the other network node may assume a role of a "follower node." Packet flow typically flows from a client to a server. Moreover, servers are assigned standard or common destination addresses that are well-known (e.g., well-known port numbers or system port numbers) or registered (e.g., registered port numbers). Accordingly, a network node is able to determine whether a packet is flowing in an outbound or forward direction of the flow, or an inbound or reverse direction based on the destination address specified in the packet. For example, if a packet received at a network node is destined for a server (e.g., the destination address of the packet is that of a server), the packet may be flowing in a forward direction of a packet flow and the network node may assume the role of a selector node. If a packet received at a network node is not destined for a server, the packet may be flowing in a reverse direction of a packet flow and the network node may assume the role of a follower node.

To process a data packet, a network node may check the destination address specified by the data packet to determine whether to act as a selector node or a follower node. Assuming that the data packet includes a destination address that is well-known (e.g., a destination address of a server), the network node may determine that the data packet is flowing in a forward direction of a packet flow to which the data packet belongs. The network node, assuming the role as a selector node, may select a tunnel for the packet flow from amongst one or more tunnels suitable to reach the specified destination based on one or more policies (e.g., flow characteristics, tunnel characteristics, and/or the like). Having selected a tunnel for the packet flow, the selector node may transmit the data packet of the packet flow through the selected tunnel to a receiving network node at the other end of the tunnel. The receiving network node at the other end of the tunnel may receive the data packet and determine a packet flow to which the received data packet belongs. The receiving network node may maintain a record of the packet flow and the tunnel through which it received the data packet of the packet flow (e.g., maintain a record of the tunnel selected by the selector node for the packet flow), and send the data packet to the next hop on the way to the specified destination.

Alternatively, assuming above that the data packet includes a destination address that is not well-known (e.g., a destination address of something other than a server), for example, a client, the network node may determine that the data packet is flowing in a reverse direction of a packet flow to which the data packet belongs. The network node, assuming the role as a follower node, may determine a packet flow to which the data packet belongs, identify the tunnel the selector node selected for the packet flow, and transmit the data packet through the identified tunnel (e.g., the same tunnel through which the follower node received the data packets of the packet flow in the forward direction from the selector node). In the role as a follower node, the network node may not select a tunnel for the data packet.

By using a tunnel selected by the selector node, the follower node need not have the intelligence (logic) to select a tunnel for the data packet. For example, there may be thousands of clients and only a few servers serving the thousands of clients. In this instance, a scalability issue may arise if each server needs to have the intelligence (logic) to communicate with any of the potentially thousands of clients. By using the tunnel (e.g., path) selected by the clients, the servers need not have the intelligence (logic) to independently select paths to the clients and, potentially, may service even a larger number of clients.

The selector node may subsequently select a different tunnel to the follower node for the packet flow, and transmit data packets of the packet flow through the different tunnel. In this instance, the follower node may update its record to indicate that the packet flow is now being received through the different tunnel, and transmit the data packets of the packet flow in the reverse direction through the different tunnel. In this manner, the follower node is able to maintain a record of the current tunnel selected by the selector node for the packet flow, and use the current tunnel to transmit the data packets of the packet flow in the reverse direction.

For example, suppose there are four tunnels, Tunnel 1, Tunnel 2, Tunnel 3, and Tunnel 4, between two network nodes, Node A and Node B. To send data packets belonging to a packet flow, Flow 1, Node A, as a selector node, may select Tunnel 1 for Flow 1 based on one or more policies. Node A may then transmit the data packets of Flow 1 through Tunnel 1. Upon receiving the data packets of Flow 1 through Tunnel 1, Node B may maintain a record, for example, in a flow table, to indicate that Flow 1 is being received through Tunnel 1. When Node B receives data packets of Flow 1 in the reverse direction, Node B, as a follower node, may determine from the flow table that Flow 1 is being received through Tunnel 1, and transmit the data packets of Flow 1 in the reverse direction through Tunnel 1. Subsequent to selecting Tunnel 1 for Flow 1, Node A may select Tunnel 3 for Flow 1, and transmit subsequent data packet or data packets of Flow 1 through Tunnel 3. Upon receiving the data packets of Flow 1 through Tunnel 3, Node B may update the record for Flow 1 to now indicate that Flow 1 is being received through Tunnel 3. When Node B subsequently receives data packets of Flow 1 in the reverse direction, Node B may determine from the flow table that Flow 1 is being received through Tunnel 3, and transmit the data packets of Flow 1 in the reverse direction through Tunnel 3.

FIG. 1 illustrates an overview of an environment 100 and devices on which some embodiments of the present disclosure may operate, arranged in accordance with at least some embodiments described herein. Environment 100 may include network nodes 102a, 102b, and 102c (collectively referred to herein as network nodes 102), logically connected to a network node 104. Each of network nodes 102a, 102b, and 102c, may be an edge network device, such as a customer edge router. Network node 104 may also be an edge network device, such as a provider edge router. The number of devices depicted in environment 100 is for illustration, and one skilled in the art will appreciate that there may be a different number of network nodes 102 and network node 104.

To facilitate movement of data between network nodes 102 and network node 104, one or more tunnels may be configured between each network node 102 and network node 104. As illustrated, three tunnels 106a, 106b, and 106c may be configured between network node 102a and network node 104, four tunnels 108a, 108b, 108c, and 108d may be configured between network node 102b and network node 104, and two tunnels 110a and 110b may be configured between network node 102c and network node 104.

In one example use scenario, network node 102b may receive a data packet to process. Network node 102b may check the destination address specified in the data packet and determine that the data packet is destined for a server. That is, network node 102b may determine that the data packet belongs to a packet flow (e.g., packet flow identified by the source address and the destination address specified in the data packet), and that the data packet is flowing in a forward direction of the packet flow. Network node 102b may determine from the destination address specified in the data packet that it may assume the role of a selector node. As a selector node, network node 102b may determine that tunnels 106a, 106b, and 106c may be used to reach the destination address specified in the data packet, and may select one of the three tunnels 106a, 106b, or 106c, for this packet flow based on one or more policies. For example, a policy may specify that Netflix traffic is to be sent over a Verizon network. Another policy may specify that Microsoft traffic is to be sent over a Comcast network. There may be other policies, such as, to select the best performing tunnel, to select the tunnel based on load balancing, and/or the like. Applying the applicable policies, network node 102a may select tunnel 106a for this packet flow, and send (e.g., transmit) the data packet through tunnel 106a for delivery to the destination. In some embodiments, network node 102b may maintain a record, for example, in a flow table, that data packets for this packet flow are being sent over tunnel 106a.

Network node 102b may process each subsequent data packet in substantially the same manner as described above. For example, for a subsequent data packet to process, network node 102b may determine whether to assume the role of a selector node or a follower node. If network node 102b determines from the destination address of the subsequent data packet that it may assume the role of a selector node, network node 102 may determine a packet flow to which the subsequent data packet belongs, determine the tunnel or tunnels suitable to send the subsequent data packet, select one of the tunnels based on the applicable policies, and send the data packet through the selected tunnel for delivery to the destination. The tunnel selected for the subsequent data packet may be the same as or different from the tunnel previously selected for the data packets of the same packet flow.

Network node 104 at the other end of tunnel 106a may receive the data packet transmitted by network node 102a through tunnel 106a. Network node 104 may determine the packet flow to which the data packet belongs, and maintain a record, for example, in a flow table, that data packets for this packet flow are being received over tunnel 106a. Network node 104 may then send the data packet to a next hop on the way to its destination.

When network node 104 receives a data packet to process, network node 104 may check the destination address specified in the data packet to determine whether to assume the role of a selector node or a follower node. If the destination address specified in the data packet is that of a server, network node 104 may assume the role of a selector node. If the destination address specified in the data packet is not of a server, network node 104 may assume the role of a follower node. Assuming in this scenario that the destination address specified in the data packet is not of a server, network node 104 may determine from the destination address specified in the data packet that the data packet is flowing (e.g., traveling) in a reverse direction of a packet flow to which the data packet belongs. Assuming the role of a follower node, network node 104 may determine a packet flow to which the data packet belongs from the source address and the destination address specified in the data packet. As the data packet is flowing in the reverse direction of the packet flow associated with the data packet, the packet flow may be identified as the reverse or "flip" of the source address and the destination address. Network node 104 may determine the tunnel that the data packets of the data flow are being received through, and transmit the data packet over the same tunnel. For example, assuming that the data packet is for the packet flow described above (e.g., the packet flow identified by the source address and the destination address specified in the data packet sent by network node 102b through tunnel 106a) in the reverse direction, network node 104 may determine from its flow table that data packets for this packet flow in the forward direction are being received through tunnel 106a. Network node 104 may then transmit the data packet for this packet flow in the reverse direction through tunnel 106a. If network node 104 is unable to send the data packet for this packet flow in the reverse direction over tunnel 106a, network node 104 may send the data packet to a next hop, for example, by following one or more applicable routing rules.

Modifications, additions, or omissions may be made to FIG. 1 without departing from the scope of the present disclosure. For example, any number of tunnels may be configured between each network node 102 and network node 104. Additionally, there may be additional network nodes similar to network node 104, and one or more tunnels configured between at least one network node 102 and any additional network node similar to network node 104.

Figure 2:
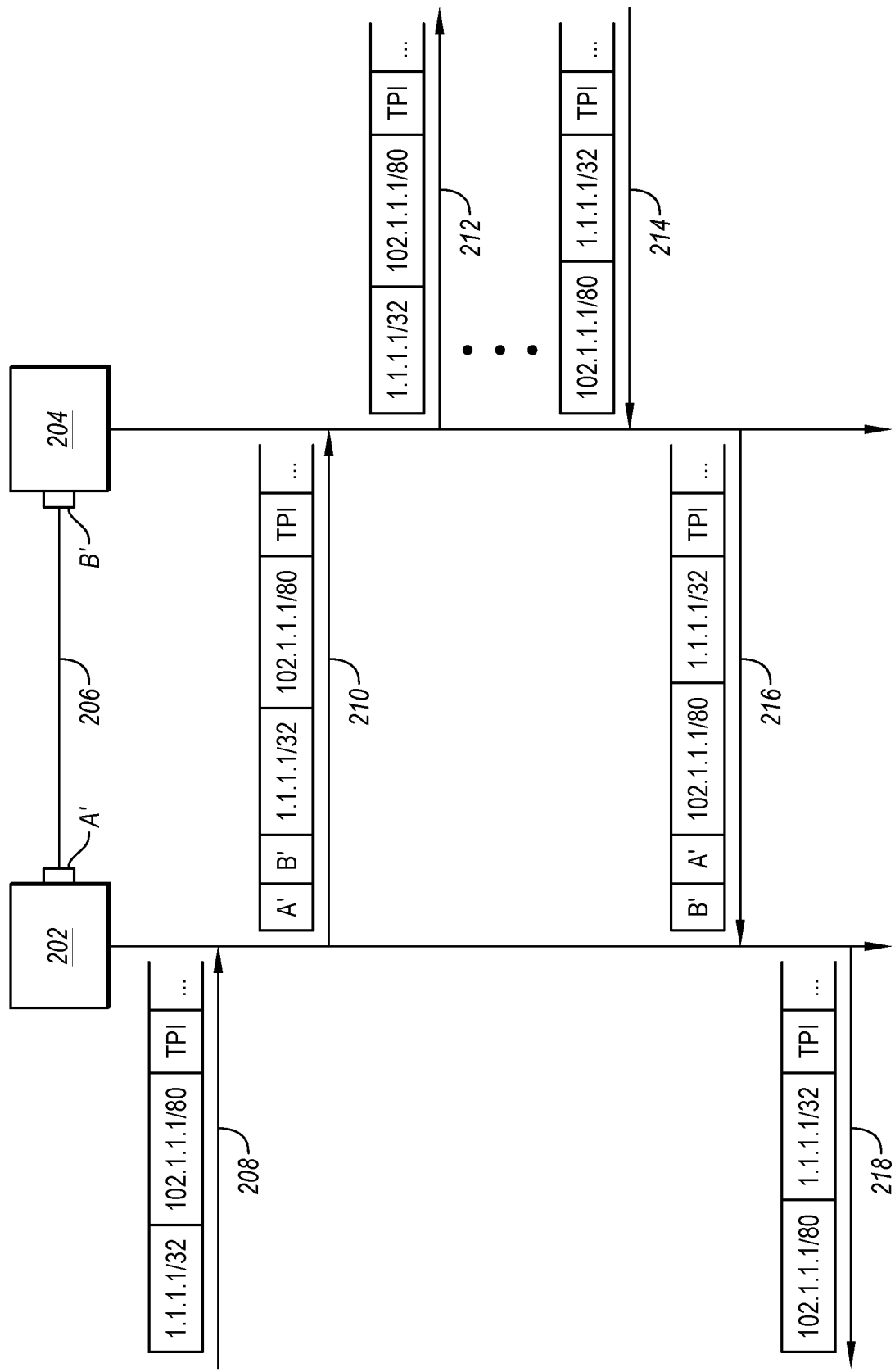
FIG. 2 is a sequence diagram that illustrates the use of overlays to route a packet flow.

FIG. 2 is a sequence diagram that illustrates the use of overlays to route a packet flow, arranged in accordance with at least some embodiments described herein. As depicted, the sequence diagram illustrates communication between a network node 202 and a network node 204 through a tunnel 206 configured between network nodes 202 and 204. One end of tunnel 206 may be logically connected to a circuit having an address A' at network node 202, and the other end of tunnel 206 may be logically connected to a circuit having an address B' at network node 204. For example, network node 202 may be an edge router at a customer site, network node 204 may be a regional router at a data center, and tunnel 206 may be a tunnel across a network (not depicted), such as a Verizon network.

Network node 202 may receive a data packet to process (e.g., send to a next hop on its way to a destination) (208). For example, the received data packet may include a source IP/port, a destination IP/port, and a transport protocol indicator 5-tuple of 1.1.1.1/32, 102.1.1.1/80, TPI. The data packet may also include other information. Network node 202 may determine that the destination IP/port specified in the data packet is that of a server (e.g., the specified destination address is well-known), and determine that the data packet is flowing in a forward direction of a packet flow associated with the data packet. Accordingly, network node 202 may assume the role of a selector node. As a selector node, network node 202 may determine that the data packet belongs to a packet flow identified by the 5-tuple source IP/port, destination IP/port, and transport protocol indicator (e.g., packet flow 1.1.1.1/32, 102.1.1.1/80, TPI). Having determined the packet flow, network node 202 may select tunnel 206 for this packet flow (packet flow 1.1.1.1/32, 102.1.1.1/80, TPI) based on one or more polices. For example, the applicable policies may specify that the packet flow to this destination (e.g., 102.1.1.1/80) be sent over the Verizon network. Having selected tunnel 206, network node 202 may encapsulate the data packet with overlay information that corresponds to (e.g., identifies) tunnel 206, and send the encapsulated data packet to network node 204 through tunnel 206 (210). For example, the overlay may be the source circuit address and the destination circuit address of tunnel 206, A' and B'. The encapsulated packet may include the overlay (A', B') and the 5-tuple (1.1.1.1/32, 102.1.1.1/80, TPI).

Network node 204 may receive the encapsulated data packet, for example, at the other end of tunnel 206. Network node 204 may remove the overlay information (A', B') from the encapsulated data packet. From the overlay information, network node 204 may identify tunnel 206 as the tunnel through which the data packet is received. Network node 204 may identify the packet flow associated with the received data packet (e.g., the packet flow to which the received data packet belongs) from the 5-tuple of the de-encapsulated data packet. For example, network node 204 may identify the packet flow as the 5-tuple 1.1.1.1/32, 102.1.1.1/80, TPI. Network node 204 may maintain a record that the packet flow identified by the 5-tuple (packet flow 1.1.1.1/32, 102.1.1.1/80, TPI) is being received over tunnel 206 in a flow table. Network node 204 may process the de-encapsulated data packet for sending to the destination specified in the data packet. The de-encapsulated data packet may include the 5-tuple (1.1.1.1/32, 102.1.1.1/80, TPI). For example, if network node 204 is at the specified destination (e.g., network node 204 is an exit point for the specified destination 102.1.1.1/80), network node 204 may deliver the data packet to the intended destination (212). Alternatively, if network node 204 is not at the specified destination, network node 204 may process the de-encapsulated data packet by assuming the role as either a selector node or a follower node as described herein.

Network node 204 may receive a data packet to process (214). For example, the received data packet may include a source IP/port, a destination IP/port, and a transport protocol indicator 5-tuple of 102.1.1.1/80, 1.1.1.1/32, TPI. The data packet may also include other information. Network node 204 may determine that the destination IP/port specified in the data packet is not of a server (e.g., the specified destination address is not well-known), and determine that the data packet is flowing in a reverse direction of a packet flow associated with the data packet. Accordingly, network node 204 may assume the role of a follower node. As a follower node, network node 204 may determine a packet flow to which the received data packet belongs. As the received data packet is flowing in the reverse direction of the packet flow, the source and destination addresses specified in the received data packet may be reversed in the outbound or forward direction of the packet flow. That is, the source address in the forward direction of the packet flow may be the destination address in the reverse direction of the packet flow, and the destination address in the forward direction of the packet flow may be the source address in the reverse direction of the packet flow. Accordingly, network node 204 may flip the order of the source IP/port and destination IP/port included in the received data packet, and, using the flipped information and the transport protocol indicator (e.g., 1.1.1.1/32, 102.1.1.1/80, TPI), search its flow table for a matching entry. The matching entry in the flow table indicates (e.g., identifies) the tunnel, for example, tunnel 206, that is being used to receive data packets belonging to the packet flow identified by the 5-tuple 1.1.1.1/32, 102.1.1.1/80, TPI. Network node 204 may encapsulate the received data packet with overlay information that corresponds to (e.g., identifies) tunnel 206, and send the encapsulated data packet to network node 202 through tunnel 206 (216). For example, the overlay may be the source circuit address and the destination circuit address of tunnel 206, B' and A'. The encapsulated packet may include the overlay (B', A') and the 5-tuple (102.1.1.1/80, 1.1.1.1/32, TPI).

Network node 202 may receive the encapsulated data packet, for example, at the other end of tunnel 206. Network node 202 may remove the overlay information (B', A') from the encapsulated data packet. From the overlay information, network node 202 may identify tunnel 206 as the tunnel through which the data packet is received. Network node 202 may identify the packet flow associated with the received data packet (e.g., the packet flow to which the received data packet belongs) from the 5-tuple of the de-encapsulated data packet. For example, network node 202 may identify the packet flow as the 5-tuple 102.1.1.1/80, 1.1.1.1/32, TPI. Network node 202 may maintain a record that the packet flow identified by the 5-tuple (packet flow 102.1.1.1/80, 1.1.1.1/32, TPI) is being received over tunnel 206 in a flow table. Network node 202 may process the de-encapsulated data packet for sending to the destination specified in the data packet. The de-encapsulated data packet may include the 5-tuple (102.1.1.1/80, 1.1.1.1/32, TPI). For example, if network node 202 is at the specified destination (e.g., network node 202 is an exit point for the specified destination 1.1.1.1/32), network node 202 may deliver the data packet to the intended destination (218). Alternatively, if network node 202 is not at the specified destination, network node 202 may process the de-encapsulated data packet by assuming the role as either a selector node or a follower node as described herein.

Modifications, additions, or omissions may be made to FIG. 2 without departing from the scope of the present disclosure. For example, any number of tunnels may be configured between network node 202 and network node 204. Additionally, there may be additional data packets being sent between network node 202 and network node 204. In another example, either or both network node 202 or network node 204 may be receiving additional data packets to process.

Figure 3:
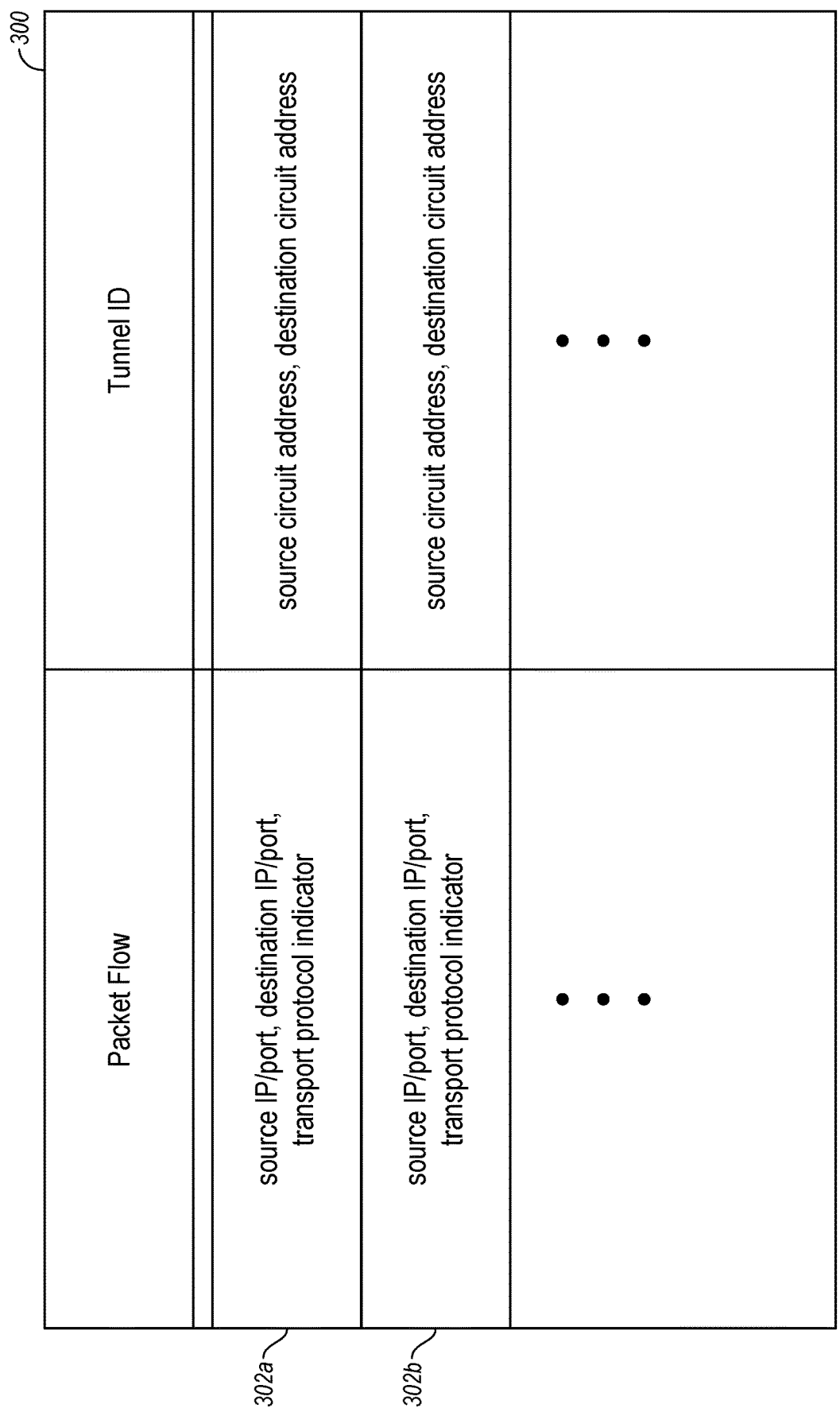
FIG. 3 illustrates an example flow table of a network node.

FIG. 3 illustrates an example flow table 300 of a network node, arranged in accordance with at least some embodiments described herein. The network node may maintain a record of packet flows and a tunnel through which data packets of each packet flow are being received in flow table 300. Flow table 300 may include one or more entries or records, for example, 302a and 302b, and each record 302a and 302b may include two fields. One field may identify a packet flow, and the other or second field may identify a tunnel. Accordingly, each record (e.g., entry) of flow table 300 may identify a packet flow and a tunnel that is being used to move or transport the packet flow. For example, the packet flow may be identified by the 5-tuple, source IP/port, destination IP/port, and transport protocol indicator, included in a data packet, and the corresponding tunnel may be identified by the source circuit address and destination circuit address of the tunnel.

Figure 4:
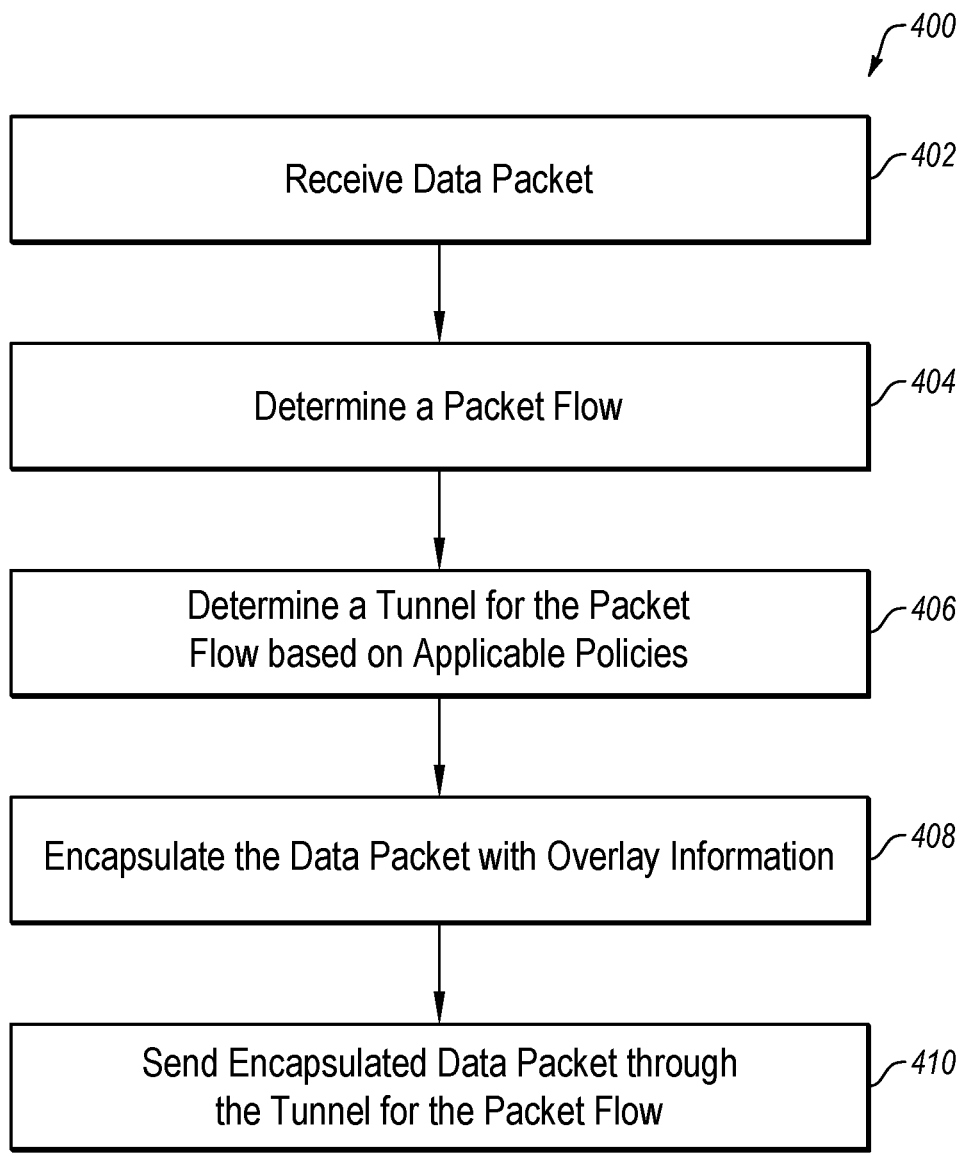
FIG. 4 is a flow diagram that illustrates an example process to transmit a data packet as a selector node.

FIG. 4 is a flow diagram 400 that illustrates an example process to transmit a data packet as a selector node, arranged in accordance with at least some embodiments described herein. Example processes and methods may include one or more operations, functions or actions as illustrated by one or more of blocks 402, 404, 406, 408, and/or 410, and may in some embodiments be performed by network node such as an edge network device 602 of FIG. 6. The operations described in blocks 402-410 may also be stored as computer-executable instructions in a computer-readable medium such as a memory 614 and/or a data storage 616 of edge network device 602.

As depicted by flow diagram 400, the example process to transmit data packets for a packet flow as a selector node may begin with block 402 ("Receive Data Packet"), where a network node may receive a data packet to process, for example, to send to a destination specified by a destination address in the data packet. The network node may determine from the specified destination address that the data packet is destined for a well-known address, and determine that the packet is flowing in a forward direction of a packet flow associated with the data packet. Accordingly, the network node may assume the role of a selector node.

Block 402 may be followed by block 404 ("Determine a Packet Flow"), where the network node may determine a packet flow to which the data packet belongs. That is, the network node may determine the packet flow that is associated with the data packet. For example, the network node may determine the packet flow from the source and destination addresses included in the data packet Block 404 may be followed by block 406 ("Determine a Tunnel for the Packet Flow based on Applicable Policies"), where the network node may select a tunnel for the packet flow, for example, based on one or more applicable polices.

Block 406 may be followed by block 408 ("Encapsulate the Data Packet with Overlay Information"), where the network node may encapsulate the data packet with the overlay information corresponding to the selected tunnel.

Block 408 may be followed by block 410 ("Send Encapsulated Data Packet through the Tunnel for the Packet Flow"), where the network node may send the encapsulated data packet through the tunnel selected for the packet flow. That is, the network node may transmit the encapsulated data packet including the overlay information corresponding to the selected tunnel. In some embodiments, the network node may maintain a record of the packet flow and the associated tunnel selected for the packet flow.

Those skilled in the art will appreciate that, for this and other processes and methods disclosed herein, the functions performed in the processes and methods may be implemented in differing order. Furthermore, the outlined actions and operations are only provided as examples, and some of the actions and operations may be optional, combined into fewer actions and operations, or expanded into additional actions and operations without detracting from the essence of the disclosed embodiments.

Figure 5:
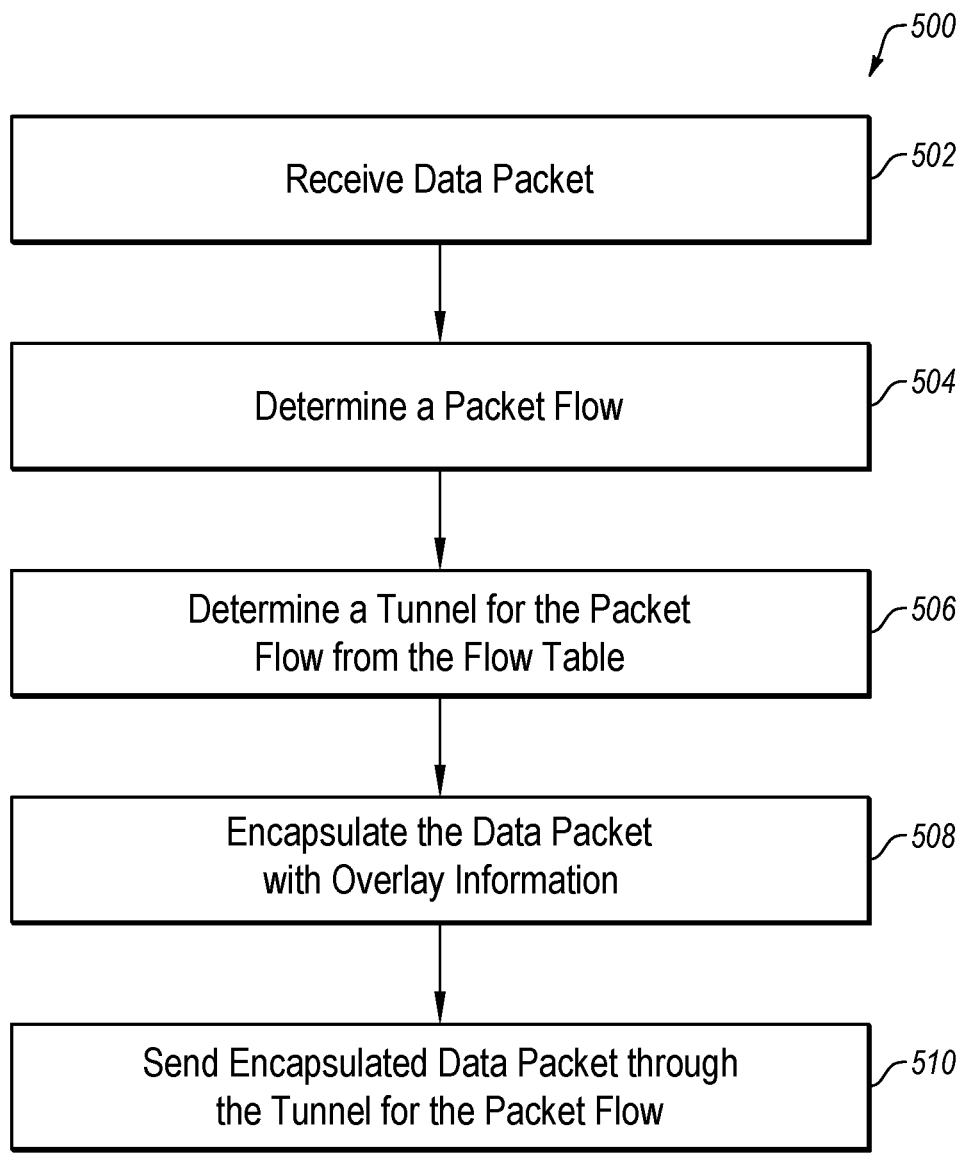
FIG. 5 is a flow diagram that illustrates an example process to transmit a data packet as a follower node.

FIG. 5 is a flow diagram 500 that illustrates an example process to transmit a data packet as a follower node, arranged in accordance with at least some embodiments described herein. Example processes and methods may include one or more operations, functions or actions as illustrated by one or more of blocks 502, 504, 506, 508 and/or 510, and may in some embodiments be performed by network node such as edge network device 602 of FIG. 6. The operations described in blocks 502-510 may also be stored as computer-executable instructions in a computer-readable medium such as a memory 614 and/or a data storage 616 of edge network device 602.

As depicted by flow diagram 500, the example process to transmit data packets for a packet flow as a follower node may begin with block 502 ("Receive Data Packet"), where a network node may receive a data packet to process, for example, to send to a destination specified by a destination address in the data packet. The network node may determine from the specified destination address that the data packet is destined for an address that is not well-known, and determine that the packet is flowing in a reverse direction of a packet flow associated with the data packet. Accordingly, the network node may assume the role of a follower node.

Block 502 may be followed by block 504 ("Determine a Packet Flow"), where the network node may determine a packet flow to which the data packet belongs. That is, the network node may determine the packet flow that is associated with the data packet. For example, since the data packet is flowing in the reverse direction of the packet flow, the network node may determine the packet flow from the reverse or flip of the source and destination addresses included in the data packet.

Block 504 may be followed by block 506 ("Determine a Tunnel for the Packet Flow from the Flow Table"), where the network node may determine a tunnel for the packet flow from its flow table. The flow table may include information regarding packet flows and the tunnels corresponding to the packet flows. For example, upon receiving a data packet through a tunnel, the network node may maintain a record of the packet flow (e.g., the packet flow to which the data packet belongs) and the tunnel through with data packet of the packet flow is being received in its flow table.

Block 506 may be followed by block 508 ("Encapsulate the Data Packet with Overlay Information"), where the network node may encapsulate the data packet with the overlay information corresponding to the selected tunnel.

Block 508 may be followed by block 510 ("Send Encapsulated Data Packet through the Tunnel for the Packet Flow"), where the network node may send the encapsulated data packet through the tunnel selected for the packet flow. That is, the network node may transmit the encapsulated data packet including the overlay information corresponding to the selected tunnel. In this manner, for a data packet flowing in the reverse direction of a packet flow, the network node is using the tunnel (e.g., following the path) selected for the packet flow in the forward direction.

Figure 6:
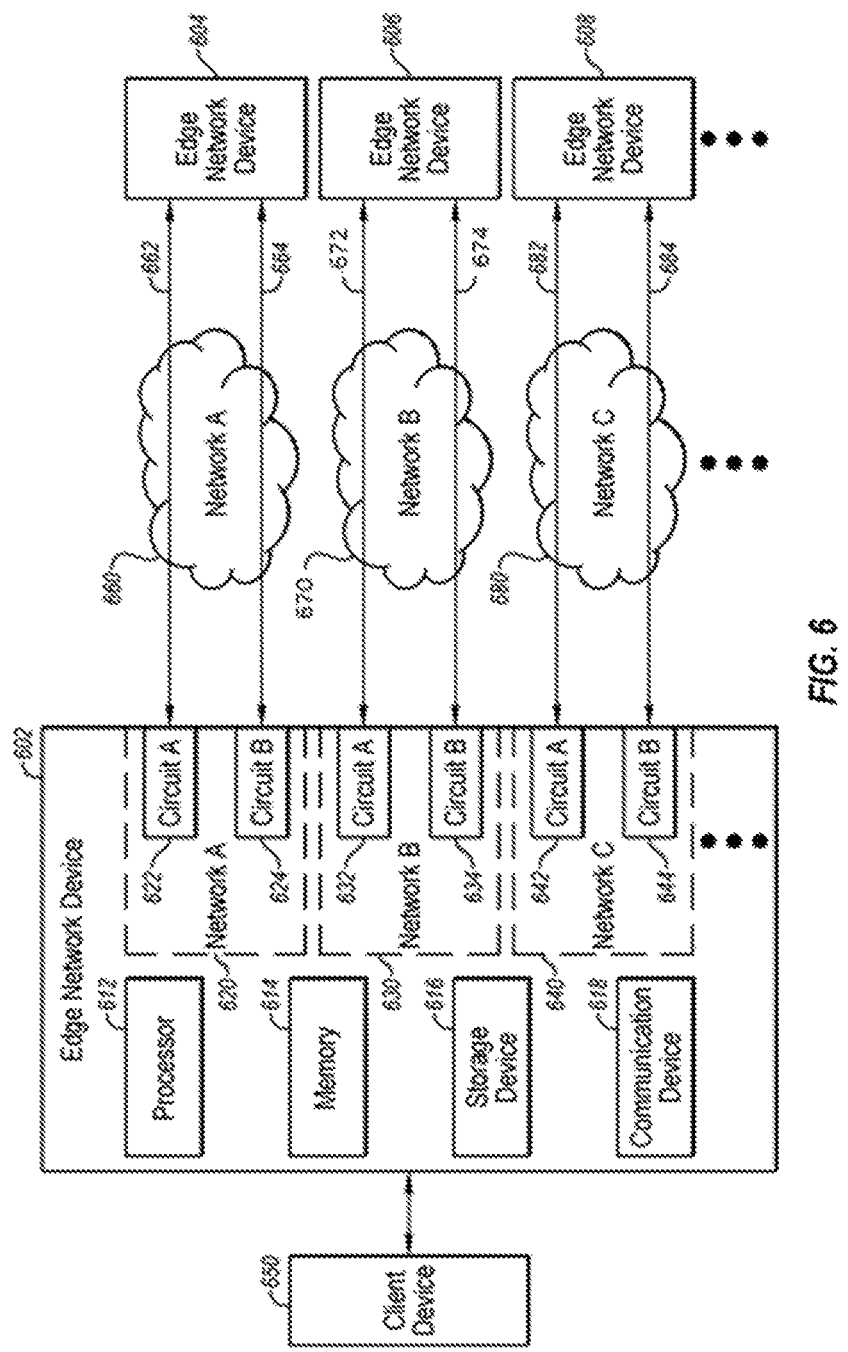
FIG. 6 illustrates an environment of an edge network device that may be used to minimize asymmetric routing, all arranged in accordance with at least some embodiments described herein.

FIG. 6 illustrates an environment 600 of edge network device 602 that may be used to minimize asymmetric routing, arranged in accordance with at least some embodiments described herein. As depicted, edge network device 602 that may include multiple potential connections for communicating with other edge network devices 604, 606, and 608. For example, edge network device 602 may communicate with edge network device 604 using a network A 660, with edge network device 606 using a network B 670, and/or with edge network device 608 using a network C 680. Edge network devices 602, 604, 606, and 608 may be similar or comparable to network nodes 102 and 104 of FIG. 1 and/or network nodes 202 and 204 of FIG. 2. Environment 600 may additionally include a client device 650 that may be communicatively coupled to edge network device 602, for example, across an external network domain.

In some embodiments, edge network device 602 may include a network A connection 620, a network B connection 630, and a network C connection 640. As illustrated by the ellipses below network C connection 640, any number of additional or other potential connections may also be included. In these and other embodiments, edge network device 602 may include multiple circuits for connecting to the one or more potential connections. For example, edge network device 602 may include a circuit A 622 and a circuit B 624 for network A connection 620, a circuit A 632 and a circuit B 634 for network B connection 630, and a circuit A 642 and a circuit B 644 for network C connection 640. In these and other embodiments, edge network device 602 may be configured to route traffic along one or more of the circuits, based on one or more policies stored by edge network device 602.

In some embodiments, edge network device 602 may be configured to monitor one or more properties of the various connections. For example, edge network device 602 may monitor the jitter, latency, loss, and/or bandwidth of the various communication links from edge network device 602 to edge network device 604, 606, and/or 608. In these and other embodiments, edge network device 602 may also monitor and/or store security properties of the various communication links. For example, links 662 and 664 over network A 660 may be considered at a first level of security, links 672 and 674 over network B 670 may be considered at a second level of security, and links 682 and 684 over network C 680 may be considered at a third level of security. In some embodiments, one or more of links 662, 664, 672, 674, 682, and/or 684 may be tunnels.

In some embodiments, edge network device 602 may route traffic intended for one or more applications to specific circuits based on one or more policies and/or based on one or more properties of the various connections. For example, a video application may be particularly susceptible to jitter. Edge network device 602 may determine that the video traffic may be travelling across link 682 with a jitter of 10 ms, and that link 662 may have a jitter of 4 ms. In this instance, edge network device 602 may shift the traffic for the video application to link 662 rather than link 682 because of the lower jitter. In some embodiments, shifting from link 682 to link 662 may be based on a jitter-based SLA. As another example, edge network device 602 may receive a data flow for a security-sensitive application (such as an accounting application) and may have a policy that data for that application is to be routed along one of network B links 672 and/or 674, even if other traffic may be routed along network A link 662. As a further example, edge network device 602 may include an SLA that a given application have a bandwidth of 10 MB/s available to the application. In this instance, edge network device 602 may make link 662 over network A 660 available to the application, but link 662 may provide 5 MB/s of bandwidth. Edge network device 602 may also provide links 682 and 684 to the application such that the overall combined bandwidth of links 662, 682, and 684 meet or exceed the bandwidth agreement of the SLA. In these and other embodiments, edge network device 602 may be configured to perform such routing based on initially receiving a data flow, during an on-going data flow, based on a triggering event of the data flow, and/or others or combinations thereof. Additionally or alternatively, such routing may combine multiple links of multiple types of connections for a single flow in routing traffic flows.

In some embodiments, edge network device 602 may be configured to route traffic to the various links based on the source of the traffic. For example, one or more policies may indicate that traffic from one corporate department of a business be routed along network B connection 630, while traffic for another corporate department may be routed along any link.

In some embodiments, edge network device 602 may include a processor 612, a memory 614, a storage device 616, and/or a communication device 618. Generally, processor 612 may include any suitable special-purpose or general-purpose computer, computing entity, or processing device including various computer hardware or software modules, and may be configured to execute instructions stored on any applicable computer-readable storage media. For example, processor 712 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 6, it is understood that processor 612 may include any number of processors distributed across any number of network or physical locations that are configured to perform individually or collectively any number of operations described in the present disclosure. In some embodiments, processor 612 may interpret and/or execute program instructions and/or process data stored in memory 614, storage device 616, or memory 614 and storage device 616. In some embodiments, processor 612 may fetch program instructions from data storage 616 and load the program instructions into memory 614. After the program instructions are loaded into memory 614, processor 612 may execute the program instructions.

Memory 614 and storage device 616 may include computer-readable storage media or one or more computer-readable storage mediums for carrying or having computer-executable instructions or data structures stored thereon. Such computer-readable storage media may be any available media that may be accessed by a general-purpose or special-purpose computer, such as processor 612. In some embodiments, edge network device 602 may or may not include either of memory 614 and storage device 616.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause processor 612 to perform a certain operation or group of operations.

Communication device 618 may include any component, device, system, or combination thereof that is configured to transmit or receive information. In some embodiments, communication device 618 may communicate with other devices at other locations, the same location, or even other components within the same system. For example, communication device 618 may include a modem, a network card (wireless or wired), an optical communication device, a radio frequency transducer, an ultrasonic transducer, an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, or others), and/or the like, and/or combinations thereof. Communication device 618 may permit data to be exchanged with a network and/or any other devices or systems described in the present disclosure. For example, communication device 618 may allow edge network device 602 to communicate with other systems, such as any one or more of edge network devices 604, 606, and 608.

Modifications, additions, or omissions may be made to environment 600 of FIG. 6 without departing from the scope of the present disclosure. For example, while illustrated as including a certain number of edge network devices 602, 604, 606, and 608, environment 600 may include any number of edge network devices. As another example, while illustrated as including three communication networks (network A 660, network B 670, and network C 680) any number of communication networks may be utilized.

As indicated above, the embodiments described in the present disclosure may include the use of a special purpose or general purpose computer (e.g., processor 612 of FIG. 6) including various computer hardware or software modules, as discussed in greater detail herein. Further, as indicated above, embodiments described in the present disclosure may be implemented using computer-readable media (e.g., memory 614 of FIG. 6) for carrying or having computer-executable instructions or data structures stored thereon.

According to some examples, methods to minimize asymmetric routing at a network node are described. An example method to minimize asymmetric routing at a network node may include maintaining a flow table including one or more records, each record indicating a packet flow and a corresponding tunnel; receiving a data packet to process at a network node; determining whether to process the data packet as a follower node; responsive to a determination to process the data packet as a follower node, determining whether there is an entry in the flow table for a packet flow associated with the received packet; and, responsive to a determination that there is an entry in the flow table for the packet flow, transmitting the received data packet through a tunnel corresponding to the packet flow. According to other examples, the method may include, responsive to a determination that the received data packet cannot be transmitted through the tunnel corresponding to the packet flow, transmitting the data packet in accordance with a routing rule for the data packet.

In some examples, the flow may be indicated by a source IP address, a destination IP address, a source port number, a destination port number, and a transport protocol indicator. In other examples, the network node may include a router. In some examples, the router may be a provider edge router. In other examples, the router may be a customer edge router.

According to other examples, network nodes configured to minimize asymmetric routing are described. An example network node may include a memory configured to store instructions and a processor configured to execute the instructions. Execution of the instructions may cause the processor to maintain a flow table including one or more records, each record indicating a packet flow and a corresponding tunnel; receive a data packet to process; determine whether to process the data packet as a follower node; responsive to a determination to process the data packet as a follower node, determine whether there is an entry in the flow table for a packet flow associated with the received packet; and, responsive to a determination that there is an entry in the flow table for the packet flow, transmit the received data packet through a tunnel corresponding to the packet flow. In some examples, execution of the instructions may cause the processor to, responsive to a determination that the received data packet cannot be transmitted through the tunnel corresponding to the packet flow, transmit the data packet in accordance with a routing rule for the data packet.

According to other examples, non-transitory computer-readable storage media storing thereon instructions for execution by a processor of a network node are described. An example non-transitory computer-readable storage media storing thereon instructions that, in response to execution by a processor of a network node, may cause the processor to maintain a flow table including one or more records, each record indicating a packet flow and a corresponding tunnel; receive a data packet to process; determine whether to process the data packet as a follower node; responsive to a determination to process the data packet as a follower node, determine whether there is an entry in the flow table for a packet flow associated with the received packet; and, responsive to a determination that there is an entry in the flow table for the packet flow, transmit the received data packet through a tunnel corresponding to the packet flow. In some examples, the non-transitory computer-readable storage media may further store thereon instructions that, in response to execution by the processor, causes the processor to, responsive to a determination that the received data packet cannot be transmitted through the tunnel corresponding to the packet flow, transmit the data packet in accordance with a routing rule for the data packet.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations, firmware implements, or any combination thereof are also possible and contemplated. In this description, a "computing entity" may be any computing system as previously described in the present disclosure, or any module or combination of modulates executing on a computing system.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method to minimize asymmetric routing at a network node, the method comprising:
   maintaining a flow table including one or more records, each record indicating a packet flow and a corresponding tunnel;
   receiving a data packet to process at a network node;
   first determining whether the received data packet is outbound or inbound to the network node;
   second determining, based on the result of the first determining, whether the network node will process the received data packet as a follower node or a selector node, where a selector node is programmed to independently select from available tunnels a selected tunnel for the data packet to reach a specified destination;
   responsive to a determination to process the data packet as a follower node, determining whether there is an entry in the flow table for a packet flow associated with the received data packet, the entry having a pre-selected tunnel for the packet flow; and
   responsive to a determination that there is an entry in the flow table for the packet flow, transmitting the received data packet through the pre-selected tunnel corresponding to the packet flow.

2. The method of claim 1, further comprising responsive to a determination that the received data packet cannot be transmitted through the pre-selected tunnel corresponding to the packet flow, transmitting the data packet in accordance with a routing rule for the data packet.

3. The method of claim 1, wherein the packet flow is identified by a source IP address, a destination IP address, a source port number, a destination port number, and a transport protocol indicator.

4. The method of claim 1, wherein the network node includes a router.

5. The method of claim 4, wherein the router is a provider edge router.

6. The method of claim 4, wherein the router is a customer edge router.

7. A network node configured to minimize asymmetric routing, the network node comprising:
   a memory configured to store instructions; and
   a processor configured to execute the instructions, wherein execution of the instructions causes the processor to:
      maintain a flow table including one or more records, each record indicating a packet flow and a corresponding tunnel;
      receive a data packet to process;
      first determine whether the received data packet is outbound or inbound to the network node;
      second determine, based on the result of the first determine, whether the network node will process the received data packet as a follower node or a selector node, where a selector node is programmed to independently select from available tunnels a selected tunnel for the data packet to reach a specified destination;
      responsive to a determination to process the data packet as a follower node, determine whether there is an entry in the flow table for a packet flow associated with the received data packet, the entry having a pre-selected tunnel for the packet flow; and
      responsive to a determination that there is an entry in the flow table for the packet flow, transmit the received data packet through the pre-selected tunnel corresponding to the packet flow.

8. The network node of claim 7, wherein execution of the instructions causes the processor to, responsive to a determination that the received data packet cannot be transmitted through the pre-selected tunnel corresponding to the packet flow, transmit the data packet in accordance with a routing rule for the data packet.

9. The network node of claim 7, wherein the packet flow is identified by a source IP address, a destination IP address, a source port number, a destination port number, and a transport protocol indicator.

10. The network node of claim 7, wherein the network node includes a router.

11. The network node of claim 10, wherein the router is a provider edge router.

12. The network node of claim 10, wherein the router is a customer edge router.

13. A non-transitory computer-readable storage media storing thereon instructions that, in response to execution by a processor of a network node, causes the processor to:
   maintain a flow table including one or more records, each record indicating a packet flow and a corresponding tunnel;
   first determine whether the received data packet is outbound or inbound to the network node;
   receive a data packet to process;
   second determine, based on the result of the first determine, whether the network node will process the received data packet as a follower node or a selector node, where a selector node is programmed to independently select from available tunnels a selected tunnel for the data packet to reach a specified destination;
   responsive to a determination to process the data packet as a follower node, determine whether there is an entry in the flow table for a packet flow associated with the received data packet, the entry having a pre-selected tunnel for the packet flow; and
   responsive to a determination that there is an entry in the flow table for the packet flow, transmit the received data packet through the pre-selected tunnel corresponding to the packet flow.

14. The non-transitory computer-readable storage media of claim 13, further storing thereon instructions that, in response to execution by the processor, causes the processor to, responsive to a determination that the received data packet cannot be transmitted through the pre-selected tunnel corresponding to the packet flow, transmit the data packet in accordance with a routing rule for the data packet.

15. The non-transitory computer-readable storage media of claim 13, wherein the packet flow is identified by a source IP address, a destination IP address, a source port number, a destination port number, and a transport protocol indicator.

16. The non-transitory computer-readable storage media of claim 13, wherein the network node includes a router.

17. The non-transitory computer-readable storage media of claim 16, wherein the router is a provider edge router.

18. The non-transitory computer-readable storage media of claim 16, wherein the router is a customer edge router.

\* \* \* \* \*